United States Patent
Liang et al.

(10) Patent No.: US 11,746,170 B2
(45) Date of Patent: Sep. 5, 2023

(54) ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/700,964

(22) Filed: Mar. 22, 2022

(65) Prior Publication Data
US 2022/0403077 A1     Dec. 22, 2022

(30) Foreign Application Priority Data

Jun. 16, 2021  (CN) .......................... 20211068489.X
Jun. 16, 2021  (TW) ............................... 110121911

(51) Int. Cl.
*C08F 216/06*       (2006.01)
*C08J 5/18*         (2006.01)
*B32B 27/08*        (2006.01)
*B32B 27/30*        (2006.01)
*B32B 27/32*        (2006.01)
*B32B 27/34*        (2006.01)
*B32B 7/12*         (2006.01)

(52) U.S. Cl.
CPC .............. *C08F 216/06* (2013.01); *B32B 7/12* (2013.01); *B32B 27/08* (2013.01); *B32B 27/306* (2013.01); *B32B 27/32* (2013.01); *B32B 27/34* (2013.01); *C08J 5/18* (2013.01); *B32B 2250/24* (2013.01); *B32B 2270/00* (2013.01); *C08J 2329/04* (2013.01)

(58) Field of Classification Search
CPC .......................... C08J 2329/04; C08F 216/06
See application file for complete search history.

(56) References Cited

U.S. PATENT DOCUMENTS

| | | | |
|---|---|---|---|
| 5,196,469 A | * | 3/1993 | Cushing ................... C08J 7/043 |
| | | | 427/407.1 |
| 2015/0152256 A1 | | 6/2015 | Nakazawa et al. |
| 2020/0079940 A1 | | 3/2020 | Usui et al. |
| 2020/0339771 A1 | | 10/2020 | Hasegawa et al. |

FOREIGN PATENT DOCUMENTS

| | | |
|---|---|---|
| CN | 110637059 A | 12/2019 |
| JP | H11291244 A | 10/1999 |
| JP | H11294947 A | 10/1999 |
| JP | 2002293948 A | 10/2002 |
| JP | 2005068324 A | 3/2005 |
| TW | 201936663 A | 9/2019 |
| WO | WO2013187455 A1 | 12/2013 |
| WO | WO2019039458 A1 | 2/2019 |

OTHER PUBLICATIONS

R. Podor, X. Le Goff, T. Cordara, M. Odorico, J. Favrichon, L. Claparede, S. Szenknect, N. Dacheux, 3D-SEM height maps series to monitor materials corrosion and dissolution, Materials Characterization, Feb. 15, 2019, pp. 220-228, vol. 150, 2019, ISSN 1044-5803, https://doi.org/10.1016/j.matchar.

* cited by examiner

*Primary Examiner* — Jeffrey C Mullis

(74) *Attorney, Agent, or Firm* — Muncy, Geissler, Olds & Lowe, P.C.

(57) ABSTRACT

The present invention relates to an ethylene-vinyl alcohol copolymer (EVOH) resin composition, an EVOH film formed therefrom, and a multilayer structure containing the same. The core void volume (Vvc) of the surface of the EVOH resin composition is more than 0.010 $\mu m^3/\mu m^2$ and less than 50 $\mu m^3/\mu m^2$; or its surface pole height (Sxp) is more than 0.010 μm and less than 9.0 μm. The invention can reduce the torque output during processing, reduce the adsorption of fine powder on the surface caused by static electricity generated on the surface of the EVOH, and provide good film thickness uniformity.

10 Claims, 2 Drawing Sheets

//<br>
ETHYLENE-VINYL ALCOHOL COPOLYMER RESIN COMPOSITION, ETHYLENE-VINYL ALCOHOL COPOLYMER FILM FORMED THEREFROM, AND MULTILAYER STRUCTURE CONTAINING THE SAME

BACKGROUND OF THE INVENTION

1. Technical Field

The present invention relates to an ethylene-vinyl alcohol copolymer (EVOH) resin composition. The ethylene-vinyl alcohol copolymer resin composition has high surface uniformity, especially the core void volume (Vvc) of its surface is more than 0.010 $\mu m^3/\mu m^2$ and less than 50 $\mu m^3/\mu m^2$; or its surface pole height (Sxp) is more than 0.010 $\mu m$ and less than 9.0 $\mu m$. The present invention also discloses a film formed from the EVOH resin composition and a multilayer structure containing the EVOH resin composition.

2. Description of Related Art

EVOH resins are widely used in laminates for preserving perishable items. For example, EVOH resins and laminates are commonly used by the food packaging industry, medical device and supplies industry, pharmaceutical industry, electronics industry, and agrochemical industry. EVOH resins are often incorporated as a distinct layer within a laminate to serve as an oxygen-barrier layer.

The conventional EVOH pellets made of EVOH resin have large surface roughness and high friction between pellets, resulting in extremely high torque during EVOH processing. Although the processability of EVOH was adjusted by adding lubricants in the past, there is still a need for further improvement.

BRIEF SUMMARY OF THE INVENTION

In view of the continuous demand for EVOH resin that can reduce the torque output during processing and achieve high surface uniformity.

The present invention relates to an ethylene-vinyl alcohol copolymer (EVOH) resin composition having high surface uniformity, wherein the ethylene-vinyl alcohol copolymer resin composition includes an ethylene-vinyl alcohol copolymer resin, for example, the core void volume (Vvc) of its surface is more than 0.010 $\mu m^3/\mu m^2$ and less than 50 $\mu m^3/\mu m^2$; or its surface pole height (Sxp) is more than 0.010 $\mu m$ and less than 9.0 $\mu m$. The EVOH resin composition may be in the form of particle(s), film(s), fiber(s) and the like. The EVOH resin composition can be used to prepare films or multilayer structures. The inventor found that by controlling the surface roughness of EVOH pellets, it is possible to reduce the torque output during EVOH processing, reduce the adsorption of fine powder on the surface of EVOH due to static electricity generated on the surface of EVOH, and reduce the number of bubbles generated during film formation and improve the uniformity of film thickness after film formation.

Additionally or alternatively, the maximum line height roughness (Rz) of the surface of the EVOH resin composition is about 0.01 to about 9.5 $\mu m$.

In another aspect of the present invention, there is provided an EVOH resin composition (or pellets thereof), the moisture content of which is less than 1%. For example, the core void volume of the surface of the EVOH resin composition of the invention is more than 0.010 $\mu m^3/\mu m^2$ and less than 40 $\mu m^3/\mu m^2$ and its moisture content is less than 1%; or the surface pole height (Sxp) of the EVOH resin composition of the invention is more than 0.010 $\mu m$ and less than 9.0 $\mu m$ and its moisture content is less than 1%. It was unexpectedly found that controlling the surface roughness and moisture content of EVOH pellets within a certain range can reduce the torque and surface static electricity in the extruder. For example, the surface electrostatic voltage of the EVOH resin composition can be less than 6 kV. The EVOH resin composition of the invention can improve the formation of bubbles in films and multilayer structures formed therefrom.

Additionally or alternatively, the ethylene-vinyl alcohol copolymer resin in the EVOH resin composition may have a saponification degree of 99.5 mole % or higher. The ethylene-vinyl alcohol copolymer resin in the EVOH resin composition may have an ethylene content of about 20 to about 48 mole %. For example, the ethylene content of the ethylene-vinyl alcohol copolymer may be about 25 to about 45 mole %. The EVOH resin composition may be formed of two or more EVOHs having different ethylene contents.

According to at least one embodiment, the multilayer structure includes: (a) at least one layer formed of the aforementioned ethylene-vinyl alcohol copolymer resin; (b) at least one polymer layer; and (c) at least one adhesive layer. The polymer layer can be selected from the group consisting of low density polyethylene layer, polyethylene grafted maleic anhydride layer, polypropylene layer and nylon layer, for example. The adhesive layer is a tie layer.

BRIEF DESCRIPTION OF THE FIGURE

Implementation of the present technology will now be described, by way of example only, with reference to the attached figures, wherein.

Figure 1:
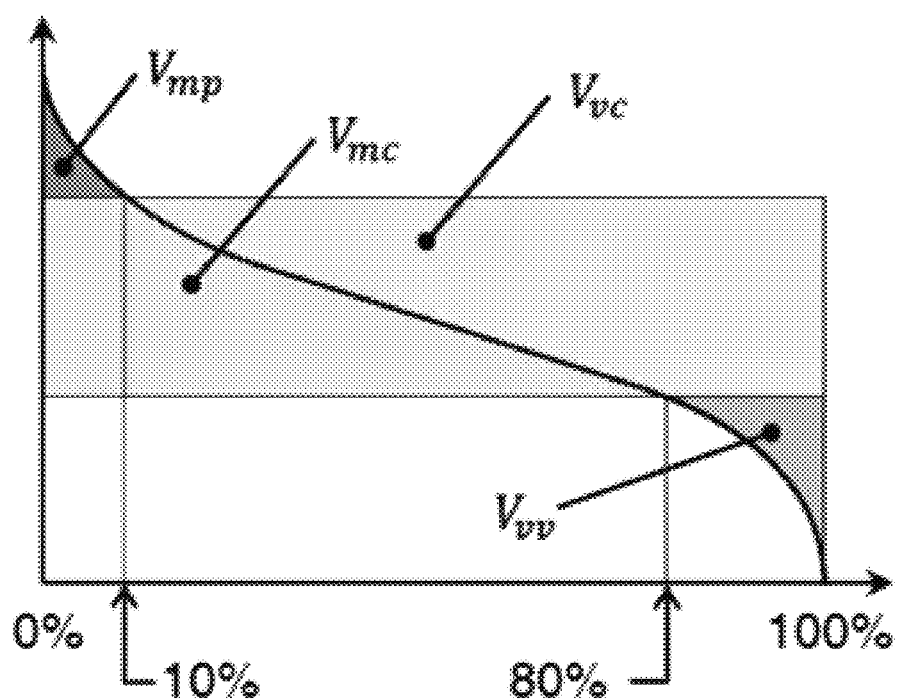
FIG. 1 is a diagram illustrating an example of the core void volume applied according to the present invention.

It should be understood that the various aspects of the present invention are not limited to the configurations, means, and characteristics shown in the drawings.

DETAILED DESCRIPTION OF THE INVENTION

The present invention relates to an ethylene-vinyl alcohol copolymer (EVOH) resin composition. The EVOH resin composition has good surface characteristics, especially the core void volume (Vvc) of the surface is more than 0.010 $\mu m^3/\mu m^2$ and less than 50 $\mu m^3/\mu m^2$; or the pole height (Sxp) of the surface is more than 0.010 $\mu m$ and less than 9.0 $\mu m$. The EVOH resin composition can be used to prepare films or multilayer structures. The inventor found that by controlling the surface roughness of EVOH pellets, it is possible to reduce the torque output during EVOH processing, and reduce the adsorption of fine powder on the surface caused by static electricity on the surface of EVOH.

The core void volume (Vvc) refers to the difference between the void volume at the load area ratio p % and the void volume at the load area ratio q %, and its definition refers to ISO 25178:2012. In addition, the sizes of the core part, the protruding wave crest, and the protruding wave trough can also be quantified by volume parameters. As shown in FIG. 1, Vmp represents the volume of the protruding wave crest, Vmc represents the volume of the core part, Vvc represents the volume of the core space, and Vvv represents the load area ratio of the protruding wave trough. In the example shown in FIG. 1, 10% and 80% are specified in the preset. The Vvc can be, for example, more than 0.010 μm³/μm² and less than 50 μm³/μm², more than 0.010 μm³/μm² and less than 45 μm³/μm², more than 0.010 μm³/μm² and less than 40 μm³/μm², more than 0.010 μm³/μm² and less than 35 μm³/μm², more than 0.010 μm³/μm² and less than 30 μm³/μm², more than 0.010 μm³/μm² and less than 25 μm³/μm², more than 0.010 μm³/μm² and less than 20 μm³/μm², more than 0.010 μm³/μm² and less than 15 μm³/μm², more than 0.010 μm³/μm² and less than 10 μm³/μm², more than 0.010 μm³/μm² and less than 5 μm³/μm², more than 0.010 μm³/μm² and less than 1 μm³/μm², more than 0.010 μm³/μm² and less than 0.1 μm³/μm², more than 1 μm³/μm² and less than 50 μm³/μm², more than 1 μm³/μm² and less than 45 μm³/μm², more than 1 μm³/μm² and less than 40 μm³/μm², more than 1 μm³/μm² and less than 35 μm³/μm², more than 1 μm³/μm² and less than 30 μm³/μm², more than 1 μm³/μm² and less than 25 μm³/μm², more than 1 μm³/μm² and less than 20 μm³/μm², more than 1 μm³/μm² and less than 15 μm³/μm², more than 1 μm³/μm² and less than 10 μm³/μm², more than 1 μm³/μm² and less than 5 μm³/μm², more than 10 μm³/μm² and less than 50 μm³/μm², more than 10 μm³/μm² and less than 45 μm³/μm², more than 10 μm³/μm² and less 40 μm³/μm², more than 10 μm³/μm² and less than 35 μm³/μm², more than 10 μm³/μm² and less than 30 μm³/μm², more than 10 μm³/μm² and less than 25 μm³/μm², more than 10 μm³/μm² and less than 20 μm³/μm², more than 10 μm³/μm² and less than 15 μm³/μm², more than 30 μm³/μm² and less than 50 μm³/μm², more than 30 μm³/μm² and less than 45 μm³/μm², more than 30 μm³/μm² and less than 40 μm³/μm², or more than 30 μm³/μm² and less than 35 μm³/μm².

Figure 2:
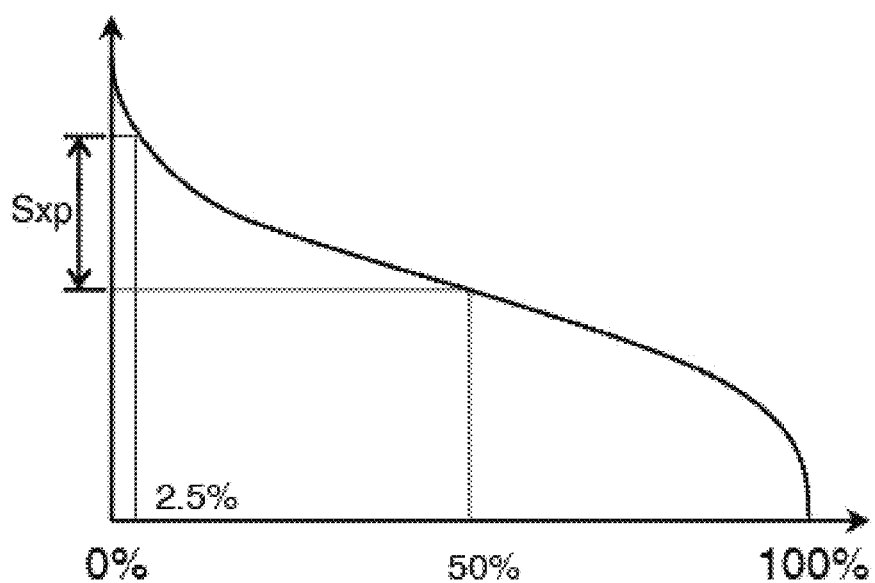
FIG. 2 is a diagram illustrating an example of the pole height applied according to the present invention.

The pole height (Sxp) refers to the height difference between the load area ratio p % and the load area ratio q %, and its definition refers to ISO 25178:2012. In addition, Sxp is calculated using the load curve. As shown in FIG. 2, Sxp represents the height difference between the average surface and the peak of the surface after removing the particularly high peaks in the surface. The example in FIG. 2 shows the height difference between the load area ratio of 2.5% and the load area ratio of 50% in the preset. Sxp can be, for example, greater than 0.010 μm and less than 9.0 μm, greater than 0.010 μm and less than 7.0 μm, greater than 0.010 μm and less than 5.0 μm, greater than 0.010 μm and less than 3.0 μm, greater than 0.010 μm and less than 1.0 μm, greater than 0.010 μm and less than 0.9 μm, greater than 0.010 μm and less than 0.7 μm, greater than 0.010 μm and less than 0.5 μm, greater than 0.010 μm and less than 0.3 μm, greater than 0.010 μm and less than 0.1 μm, greater than 0.010 μm and less than 0.09 μm, greater than 0.010 μm and less than 0.07 μm, greater than 0.010 μm and less than 0.05 μm, greater than 0.010 μm and less than 0.03 μm, greater than 0.1 μm and less than 9.0 μm, greater than 0.1 μm and less than 7.0 μm, greater than 0.1 μm and less than 5.0 μm, greater than 0.1 μm and less than 3.0 μm, greater than 0.1 μm and less than 1.0 μm, greater than 0.1 μm and less than 0.9 μm, greater than 0.1 μm and less than 0.7 μm, greater than 0.1 μm and less than 0.5 μm, greater than 0.1 μm and less than 0.3 μm, greater than 1.0 μm and less than 9.0 μm, greater than 1.0 μm and less than 7.0 μm, greater than 1.0 μm and less than 5.0 μm, or greater than 1.0 μm and less than 3.0 μm.

In one aspect, the present invention provides an EVOH resin composition. The EVOH resin composition may be in the form of pellet(s), film(s), fiber(s) and the like. The EVOH pellets mentioned herein refer to the form and/or shape of one or more pellets of the EVOH resin composition after pelletization. Although the EVOH resin composition that is pelletized to form one or more EVOH pellets is described throughout the present invention, the EVOH resin composition can also be processed into the form of beads, cubes, chips, shavings, and the like. In some embodiments, the EVOH resin composition is in the pellet form. The so-called pellet form can be columnar shape, round particle shape or flat shape, wherein the columnar shape can be cylindrical shape, elliptical columnar shape, angular columnar shape, and the round particle shape can be round shape, elliptical shape, or Go-shape.

The surface roughness characteristics of the EVOH resin composition can also be described by the maximum line height (Rz). The definition standard of Rz refers to JIS B 0601-2001. The Rz is the sum of the height of the highest crest and the depth of the deepest trough in the profile curve on the reference length. In one embodiment, the Rz of the surface of the EVOH resin composition may be about 0.01 μm to about 9.9 μm, for example, about 0.01 μm to about 9.9 μm, about 0.01 μm to about 9.5 μm, about 0.01 μm to about 9 μm, about 0.01 μm to about 8.5 μm, about 0.01 μm to about 8 μm, about 0.01 μm to about 7.5 μm, about 0.01 μm to about 7 μm, about 0.01 μm to about 6.5 μm, about 0.01 μm to about 6 μm, about 0.01 μm to about 5.5 μm, about 0.01 μm to about 5 μm, about 0.01 μm to about 4.5 μm, about 0.01 μm to about 4 μm, about 0.01 μm to about 3.5 μm, about 0.01 μm to about 3 μm, about 0.01 μm to about 2.5 μm, about 0.01 μm to about 2 μm, about 0.01 μm to about 1.5 μm, about 0.01 μm to about 1 μm, about 0.02 μm to about 9.5 μm, about 0.02 μm to about 8.5 μm, about 0.02 μm to about 7.5 μm, about 0.02 μm to about 6.5 μm, about 0.02 μm to about 5.5 μm, about 0.02 μm to about 4.5 μm, about 0.02 μm to about 3.5 μm, about 0.02 μm to about 2.5 μm, about 0.02 μm to about 1.5 μm, about 0.1 μm to about 9.5 μm, about 0.1 μm to about 8.5 μm, about 0.1 μm to about 7.5 μm, about 0.1 μm to about 6.5 μm, about 0.1 μm to about 5.5 μm, about 0.1 μm to about 4.5 μm, about 0.1 μm to about 3.5 μm, about 0.1 μm to about 2.5 μm, about 0.1 μm to about 1.5 μm, about 1 μm to about 9.5 μm, about 1 μm to about 8.5 μm, about 1 μm to about 7.5 μm, about 1 μm to about 6.5 μm, about 1 μm to about 5.5 μm, about 1 μm to about 4.5 μm, about 1 μm to about 3.5 μm, about 1 μm to about 2.5 μm, about 1 μm to about 1.5 μm, about 5 μm to about 9.5 μm, about 5 μm to about 9 μm, about 5 μm to about 8.5 μm, about 5 μm to about 8 μm, about 5 μm to about 7.5 μm, about 5 μm to about 7 μm, about 5 μm to about 6.5 μm, or about 5 μm to about 6 μm.

The EVOH resin composition of the present invention usually has a specific range of moisture content, for example, the moisture content of the EVOH resin composition is evaluated by volatile content. The moisture content of the EVOH resin composition can be less than 1% (wt %), less than 0.9%, less than 0.8%, less than 0.7%, less than 0.6%, less than 0.5%, less than 0.4%, less than 0.3%, less than 0.2%, less than 0.1%, between 0.01 and 1 wt %, between 0.08 and 1 wt %, or between 0.05 and 1 wt %. It was unexpectedly discovered that controlling the moisture content of the EVOH resin composition within a certain range can reduce the torque and surface static electricity in the extruder, and reduce the formation of bubbles in the film or multilayer structure formed by the EVOH resin composition.

The surface electrostatic voltage of the EVOH resin composition of the present invention can be less than 6 kV, for example, less than 6 kV, less than 5.5 kV, less than 5 kV, less than 4.5 kV, less than 4 kV, less than 3.5 kV, less than 3 kV, less than 2.5 kV, less than 2 kV, or less than 1 kV.

The EVOH pellets are formed of an EVOH, and the EVOH has an ethylene content. For example, the ethylene content of the EVOH may be about 20 to about 48 mole %, about 20 to about 45 mole %, about 25 to about 45 mole %, about 28 to about 42 mole %, or about 30 to about 40 mole %. The EVOH resin composition may be formed of two or more EVOHs having different ethylene contents. For example, the ethylene content of one of the EVOHs may be in the range of about 20 to about 35 mole %, for example, about 24 to about 35 mole %, about 28 to about 35 mole %, about 20 to about 32 mole %, about 24 to about 32 mole %, about 28 to about 32 mole %, about 20 to about 30 mole %, or about 24 to about 30 mole %. Additionally or alternatively, the ethylene content of one of the EVOHs may be in the range of about 36 to about 48 mole %, for example, about 40 to about 48 mole %, about 44 to about 48 mole %, about 36 to about 45 mole %, or about 40 to about 45 mole %. However, in some preferred embodiments, the EVOH resin composition is formed from a single EVOH with an ethylene content of about 20 to about 48 mole %.

Additionally or alternatively, the saponification degree of the EVOH may be 90 mole % or higher, preferably 95 mole % or higher, preferably 97 mole % or higher, preferably 99.5 mole % or higher.

The EVOH resin composition may contain a boron compound and/or boric acid and/or cinnamic acid and/or alkali metals and/or conjugated polyenes and/or lubricants and/or alkaline earth metals in some cases. The above-mentioned materials can impart better properties to the EVOH resin composition.

A typical EVOH resin composition may include an ethylene-vinyl alcohol copolymer and a boron compound, wherein the boron content of the EVOH resin composition is 10 to 450 ppm. In some cases, the boron content of the EVOH resin composition based on the total weight of the EVOH resin composition may be 10 to 450 ppm, 10 to about 400 ppm, 10 to about 350 ppm, 10 to about 300 ppm, 10 to about 275 ppm, 10 to about 250 ppm, 10 to about 225 ppm, 10 to about 200 ppm, 10 to about 175 ppm, about 20 to 450 ppm, about 20 to about 400 ppm, about 20 to about 350 ppm, about 20 to about 300 ppm, about 20 to about 275 ppm, about 20 to about 250 ppm, about 20 to about 225 ppm, about 20 to about 200 ppm, about 20 to about 175 ppm, about 60 to 450 ppm, about 60 to about 400 ppm, about 60 to about 350 ppm, about 60 to about 300 ppm, about 60 to about 275 ppm, about 60 to about 250 ppm, about 60 to about 225 ppm, about 60 to about 200 ppm, about 60 to about 175 ppm, about 100 to 450 ppm, about 100 to about 400 ppm, about 100 to about 350 ppm, about 100 to about 300 ppm, about 100 to about 275 ppm, about 100 to about 250 ppm, about 100 to about 225 ppm, about 100 to about 200 ppm, about 100 to about 175 ppm, about 140 to 450 ppm, about 140 to about 400 ppm, about 140 to about 350 ppm, about 140 to about 300 ppm, about 140 to about 275 ppm, about 140 to about 250 ppm, about 140 to about 225 ppm, about 140 to about 200 ppm, about 180 to about 450 ppm, about 180 to about 400 ppm, about 180 to about 350 ppm, about 180 to about 300 ppm, about 180 to about 275 ppm, about 180 to about 250 ppm, about 180 to about 225 ppm, about 220 to 450 ppm, about 220 to about 400 ppm, about 220 to about 350 ppm, about 220 to about 300 ppm, or about 220 to about 275 ppm. When the boron content of the EVOH resin composition is within a certain range, the viscosity of the EVOH resin composition can be increased and the chance of the EVOH resin composition sticking to the screw can be reduced, or the EVOH on the screw can be removed, so that the material has a self-cleaning function and further improves the uniformity of the film thickness. In some cases, in addition to the boron content of 10 to 450 ppm, the EVOH resin composition may further include cinnamic acid, alkali metals, conjugated polyenes, alkaline earth metals, salts thereof, and/or mixtures thereof. The above-mentioned substances are common substances usually present in the EVOH resin composition, giving it better properties. If the content of the conjugated polyene in the EVOH resin composition per unit weight is 1 to 30000 ppm, the coloration after heating can be further suppressed and the thermal stability can be improved. If the content of the alkali metal or alkaline earth metal in the EVOH resin composition per unit weight is 1 to 1000 ppm in terms of metal, the long-term operation formability can be improved.

The boron compound may, in some instances, include boric acid or a metal salt thereof. Examples of the metal salt include, but are not limited to, calcium borate, cobalt borate, zinc borate (e.g., zinc tetraborate or zinc metaborate), potassium aluminum borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., copper (II) borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganese (I) borate, manganese metaborate, or manganese tetraborate), lithium borate (e.g., lithium metaborate, lithium tetraborate, or lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

The EVOH resin composition may have an alkali metal content of about 10-550 ppm. The alkali metal content can be, for example, 10-550 ppm, about 10-500 ppm, about 10-450 ppm, about 10-400 ppm, about 10-350 ppm, about 10-300 ppm, about 10-250 ppm, about 10-200 ppm, about 10-150 ppm, about 10-100 ppm, about 10-50 ppm, about 50-550 ppm, about 50-500 ppm, about 50-450 ppm, about 50-400 ppm, about 50-350 ppm, about 50-300 ppm, about 50-250 ppm, about 50-200 ppm, about 50-150 ppm, about 50-100 ppm, about 100-550 ppm, about 100-500 ppm, about 100-450 ppm, about 100-400 ppm, about 100-350 ppm, about 100-300 ppm, about 100-250 ppm, about 100-200 ppm, about 100-150 ppm, about 200-550 ppm, about 200-500 ppm, about 200-450 ppm, about 200-400 ppm, about 200-350 ppm, about 200-300 ppm, about 200-250 ppm, about 300-550 ppm, about 300-500 ppm, about 300-450 ppm, about 300-400 ppm, about 300-350 ppm, about 400-550 ppm, about 400-500 ppm, about 400-450 ppm, or about 500-550 ppm.

When the EVOH pellets are cylindrical or elliptical cylindrical, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of its cross-sectional area can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

When the EVOH pellets are in the round particle shape, the round particle shape can be round shape, elliptical shape, or Go-shape, where the maximum outer diameter of the pellet is taken as the long side, and the maximum diameter in the cross section with the largest area in the cross section perpendicular to the long side is taken as the short side. The long side can be 1.5-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and the short side can be 1.5-5.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

The EVOH resin composition is beneficial to more efficiently prepare the EVOH film formed therefrom. Suitable methods and equipment for preparing the EVOH film may include methods and equipment easily understood by those skilled in the art. The inventor believes that by controlling the surface roughness of the EVOH resin composition, the torque and surface static electricity of the EVOH resin composition in the extruder can be reduced, and the formation of bubbles in the film or multilayer structure formed by the EVOH resin composition can also be reduced.

In yet another aspect, the present invention provides a multilayer structure having at least one layer formed from the EVOH resin composition of the present invention; at least one polymer layer; and at least one adhesive layer. The polymer layer can be selected from a low-density polyethylene layer, a polyethylene grafted maleic anhydride layer, a polypropylene layer, a nylon layer, and combinations thereof. The adhesive layer may be a tie layer, such as ARKEMA OREVAC 18729 from ARKEMA.

EXAMPLES

The following non-limiting examples of various aspects of the present invention are provided mainly to illustrate the various aspects of the invention and the benefits derived therefrom.

Example 1

A non-limiting preparation method of EVOH pellets formed from the EVOH resin composition is provided as follows. Five non-limiting example EVOH resin compositions (Example EVOH 1-5) and five comparative example EVOH resin compositions (Comparative Example EVOH 1-5) were prepared according to a method similar to the method disclosed below. However, the specific methods for preparing Example EVOH 1-5 and Comparative Example EVOH 1-5 are generally different from the methods disclosed below in one or more aspects.

Example EVOH 1 Pellets

Ethylene-vinyl acetate copolymer (EVAC) with an ethylene content of 29 mole % was saponified with a saponification degree of 99.5% to prepare an EVOH polymer. Subsequently, the EVOH was dissolved in a solution containing methanol and water (70:30). After that, the EVOH solid content of the solution was 41 wt. %, and the solution was placed at 60° C.

Then the solution containing methanol, water and EVOH was pelletized by underwater pelletization. Specifically, the solution containing methanol, water and EVOH was pumped into the feed pipe at a flow rate of 120 L/min using a pump, and then fed into the input pipe with a diameter of 2.8 mm, and cut at 1500 rpm using a rotary knife to obtain EVOH pellets. At the same time, 5° C. circulating condensate water was used to cool the EVOH pellets. Subsequently, the EVOH pellets were centrifuged to separate EVOH particles. The separated EVOH particles were washed with water, and then the EVOH particles were immersed in a boric acid/sodium acetate solution. The concentration of the boric acid/sodium acetate solution was adjusted according to the boron content and alkali metal content of the final product. Finally, three-stage drying was performed with different dryers to obtain EVOH round pellets with a long side of 3.0 mm and a short side of 2.4 mm.

The state of the aforementioned three-stage drying is as follows: the first stage of drying uses a flow dryer to dry at 80° C. for 5 hours; the second stage of drying uses a belt dryer to dry at 100° C. for 20 hours; and the third stage of drying uses an infrared dryer to dry at 120° C. for 20 hours.

Example EVOH 2 Pellets

The EVOH pellets used in Example EVOH 2 were prepared using a process similar to that of Example EVOH 1 pellets. However, when the EVOH pellets of Example EVOH 2 were prepared, the state of the three-stage drying was as follows: the first stage of drying used a flow dryer to dry at 80° C. for 5 hours; the second stage of drying used a belt dryer to dry at 100° C. for 20 hours; and the third stage of drying used a belt dryer to dry at 120° C. for 20 hours.

Example EVOH 3 Pellets

The EVOH pellets used in Example EVOH 3 were prepared using a process similar to that of Example EVOH 1 pellets. However, the EVOH pellets of Example EVOH 3 are round granular pellets with a long side of 1.5 mm and a short side of 1.5 mm, and the state of the three-stage drying was as follows: the first stage of drying used a vertical dryer to dry at 80° C. for 5 hours; the second stage of drying used a vertical dryer to dry at 100° C. for 20 hours; and the third stage of drying used a ventilating rotary dryer to dry at 120° C. for 20 hours.

Example EVOH 4 Pellets

The EVOH pellets used in Example EVOH 4 were prepared using a process similar to that of Example EVOH 1 pellets. However, when the EVOH pellets of Example EVOH 4 were prepared, the state of the three-stage drying was as follows: the first stage of drying used a belt dryer to dry at 80° C. for 5 hours; the second stage of drying used a box dryer to dry at 100° C. for 20 hours; and the third stage of drying used a cylindrical stirring dryer to dry at 120° C. for 20 hours.

Example EVOH 5 Pellets

The EVOH pellets used in Example EVOH 5 were prepared using a process similar to that of Example EVOH 1 pellets. However, the EVOH pellets of Example EVOH 5 are round granular pellets with a long side of 5 mm and a short side of 5 mm, and the state of the three-stage drying was as follows: the first stage of drying used a microwave dryer to dry at 80° C. for 5 hours; the second stage of drying used a ventilating rotary mixer to dry at 100° C. for 20 hours; and the third stage of drying used a belt dryer to dry at 120° C. for 20 hours.

Comparative Example EVOH 1 Pellets

The EVOH pellets used in Comparative Example EVOH 1 were prepared using a process similar to that of Example EVOH 1 pellets. However, when the EVOH pellets of Comparative Example EVOH 1 were prepared, the state of the three-stage drying was as follows: the first stage of drying used an airflow dryer to dry at 80° C. for 5 hours; the second stage of drying used a box dryer to dry at 100° C. for 20 hours; and the third stage of drying used a belt dryer to dry at 120° C. for 20 hours.

Comparative Example EVOH 2 Pellets

The EVOH pellets used in Comparative Example EVOH 2 were prepared using a process similar to that of Example EVOH 1 pellets. However, when the EVOH pellets of Comparative Example EVOH 2 are prepared, the state of the three-stage drying was as follows: the first stage of drying used a cylindrical stirring dryer to dry at 80° C. for 5 hours; the second stage of drying used a ventilating rotary dryer to dry at 100° C. for 20 hours; and the third stage of drying used a belt dryer to dry at 120° C. for 20 hours.

Comparative Example EVOH 3 Pellets

The EVOH pellets used in Comparative Example EVOH 3 were prepared using a process similar to that of Example EVOH 1 pellets. However, when preparing the EVOH pellets of Comparative Example EVOH 3, the state of the three-stage drying was as follows: the first stage of drying used an infrared dryer to dry at 80° C. for 5 hours; the second stage of drying used a cylindrical stirring dryer to dry at 100° C. for 20 hours; and the third stage of drying used an airflow dryer to dry at 120° C. for 20 hours.

Comparative Example EVOH 4 Pellets

The EVOH pellets used in Comparative Example EVOH 4 were prepared using a process similar to that of Example EVOH 1 pellets. However, when preparing the EVOH pellets of Comparative Example EVOH 4, the state of the three-stage drying was as follows: the first stage of drying used an infrared dryer to dry at 80° C. for 5 hours; the second stage of drying used a box dryer to dry at 100° C. for 20 hours; and the third stage of drying used a microwave dryer to dry at 120° C. for 20 hours.

Comparative Example EVOH 5 Pellets

An ethylene-vinyl acetate copolymer (EVAC) with an ethylene content of 32 mole % was saponified with a saponification degree of 99.5% to prepare an EVOH polymer. Subsequently, the EVOH was dissolved in a solution containing methanol and water (70:30). After that, the EVOH solid content of the solution was 41 wt. %, and the solution was placed at 60° C.

Then the solution containing methanol, water and EVOH was pelletized by underwater pelletization. Specifically, the solution containing methanol, water, and EVOH was pumped into the feed pipe using a pump at a flow rate of 120 L/min, and then fed into the input pipe with a diameter of 2.8 mm, and cut with a rotary knife at 1500 rpm. Water at 5° C. was added to cool the EVOH pellets. Subsequently, the EVOH pellets were centrifuged to separate EVOH particles. The separated EVOH particles were washed with water, and then blown into air at 77° C. with a flow dryer at a flow rate of 0.7 m/s, dried for 1 hour, and then blown into nitrogen at 120° C. with a box dryer at a flow rate of 0.3 m/s, and dried for 18 hours, and finally a dried EVOH resin composition was obtained.

The aforementioned box dryer, belt dryer, microwave dryer and infrared dryer are "static dryers"; vertical dryer and flow dryer are "turbulent dryers"; and cylindrical stirring dryer, ventilating rotary dryer and airflow dryer are "strong turbulence dryers". A brief description of the turbulent dryer and the strong turbulence dryer is as follows:

[Turbulent dryer] (The particles are only moved in one direction or are moved slightly)
    Vertical dryer: the full particles are vertically downward, and the hot air is blown in parallel;
    Flow dryer: similar to a hot air oven, but with a larger air volume, wherein the particles are slightly blown upward by the wind.

[Strong turbulence dryer] (The particles are moved in more than two directions or are moved violently)
    Cylindrical stirring dryer: stirring with external force, so the particles collide in the front, back, left, and right directions.
    Ventilating rotary dryer: particles collide in the tube wall during drying.
    Airflow dryer: the wind is strong, which quickly drives the particles to move, causing the particles to collide in the tube wall.

Example 2

The EVOH pellets 1-5 of the Examples were used to form films respectively according to the following method. Example EVOH pellets 1-5 and Comparative Example EVOH pellets 1-5 were fed into a single layer T-die cast film extruder (Optical Control System MEV4) to prepare films. The thicknesses of the films formed from Example EVOH pellets 1-5 and Comparative Example EVOH pellets 1-5 were each 20 μm. The temperature of the extruder was set to 220° C., and the temperature of the die (i.e., T-die) was set to 230° C. The rotation frequency of the screw was 7 rpm (rotations/minutes).

Example 3

Example EVOH pellets 1-5 and Comparative Example EVOH pellets 1-5 were evaluated to judge the properties of these EVOH pellets and the films formed therefrom. As described above, Example EVOH pellets 1-5 were prepared according to a method similar to that described in Example 1. However, the methods of preparing EVOH pellets 1-5 differ in terms of the prepared EVOH pellets in the following aspects: Vvc, Sxp, moisture content of pellet or Rz. Comparative Example EVOH pellets 1-5 were also prepared according to a method similar to that described in Example 1.

The average torque of the extruder, the current of the extruder, the surface static electricity of EVOH pellets, the adhesion rate of fine powder, and the uniformity of film thickness were further evaluated. Films were individually formed from Example EVOH 1-5 and Comparative Example EVOH 1-5 in a method similar to that described in Example 2, and the films were evaluated to judge bubble formation on the film.

Table 1 provides a summary of some properties of Example EVOH pellets 1-5 and Comparative Example EVOH pellets 1-5 (i.e., Vvc, Sxp, moisture content of pellet, Rz, average torque of extruder, current of extruder, surface static electricity of EVOH pellet, adhesion rate of fine powder, and uniformity of film thickness), and the bubble generation of the films formed from EVOH 1-5 and Comparative Example EVOH 1-5.

platinum dish was cooled, and 1 mL of hydrochloric acid was added to dissolve the substance. This hydrochloric acid solution was washed with ultrapure water and the volume was made up to 50 mL. The alkali metal content in this sample solution was determined by inductively coupled plasma atomic emission spectrometry (ICP-AES; 720-ES, Agilent Technology). Finally, the alkali metal content in the above-mentioned EVOH composition pellets was converted from the alkali metal concentration in the solution.

In order to evaluate the surface roughness of Example EVOH 1-5 pellets and Comparative Example EVOH 1-5 pellets, the EVOH pellets were placed flat on the board, and the surface roughness of the pellets was measured. When measuring, it was necessary to exclude the data when the

TABLE 1

|  | Example EVOH 1 | Example EVOH 2 | Example EVOH 3 | Example EVOH 4 | Example EVOH 5 | Comparative Example EVOH 1 | Comparative Example EVOH 2 | Comparative Example EVOH 3 | Comparative Example EVOH 4 | Comparative Example EVOH 5 |
|---|---|---|---|---|---|---|---|---|---|---|
| Core void volume (Vvc, $\mu m^3/\mu m^2$) | 0.012 | 0.132 | 39.82 | 1.35 | 15.32 | 53.24 | 84.53 | 100.2 | 0.010 | 0.001 |
| Pole height (Sxp, $\mu m$) | 0.013 | 0.341 | 8.714 | 0.524 | 6.77 | 10.24 | 25.32 | 41.72 | 0.010 | 0.001 |
| Moisture content of pellet | 0.08% | 0.96% | 0.54% | 0.09% | 0.21% | 0.11% | 0.05% | 0.07% | 1.2% | 0.15% |
| Boron content (ppm) | 30 | 30 | 100 | 350 | 300 | 300 | 30 | 160 | 320 | 310 |
| Alkali metal content (ppm) | 40 | 40 | 130 | 450 | 320 | 40 | 240 | 380 | 120 | 170 |
| Maximum line height (Rz, $\mu m$) | 0.021 | 0.514 | 9.01 | 0.621 | 7.65 | 11.05 | 29.73 | 49.28 | 0.022 | 0.001 |
| Average torque of single screw extruder | ○ | ○ | Δ | ○ | ○ | X | X | X | ○ | ○ |
| Current of single screw extruder | ○ | ○ | Δ | ○ | Δ | X | X | X | ○ | ○ |
| "Surface static electricity of EVOH pellet, ANSI/ESD STM3.1" | ○ | ○ | Δ | ○ | ○ | X | X | X | ○ | ○ |
| Uniformity of film thickness | ○ | ○ | ○ | ○ | ○ | X | X | X | X | X |
| Adhesion rate of fine powder | ○ | ○ | Δ | ○ | ○ | X | X | X | ○ | ○ |
| Bubbles on the film | ○ | ○ | ○ | ○ | ○ | ○ | ○ | ○ | X | ○ |

The boron content of each Example and Comparative Example was measured by the following method. First, a sample of 0.1 g EVOH pellets was decomposed by concentrated nitric acid and microwave to make EVOH pellets form a sample solution. Then the sample solution was diluted with pure water to adjust its concentration to 0.75 mg/mL. The boron content in the sample solution was measured using inductively coupled plasma optical emission spectrometry (ICP-OES; iCAP7000, Thermo Fisher Scientific). The boron content refers to the measured value corresponding to the boron content derived from the boron compound used.

In addition, the alkali metal content in the EVOH pellets of the respective Examples and Comparative Examples was also measured. 2 g of the above-mentioned EVOH pellets were put into a platinum dish, added with a few milliliters of sulfuric acid, and then heated with a gas burner. After confirming that the pellets were carbonized and the sulfuric acid white smoke disappeared, the substance was added with a few drops of sulfuric acid and then heated again. This operation was repeated until the organic matter disappeared and the matter was completely ashed. After ashing, the inclination was greater than 0.5 to ensure that the scanning plane is relatively horizontal. Inclination=Maximum surface height Sz/Side length of the analysis range (i.e., 129 $\mu m$). The laser microscope was LEXT OLS5000-SAF manufactured by Olympus, and the image was made at an air temperature of 24±3° C. and a relative humidity of 63±3%. The filter was set to no filter. The light source was a light source with a wavelength of 405 nm. The objective lens was a 100× magnifying glass (MPLAPON-100×LEXT). The optical zoom was set to 1.0×. The image area was set to 129 $\mu m$×129 $\mu m$. (When measuring Rz, the center line of the image area was taken.) The resolution was set to 1024 pixels×1024 pixels. The value of 100 pellets was measured and the average value was taken. Among them, Vvc and Sxp were measured by the method of ISO 25178:2012, and Rz was measured by the method of JIS B 0601-2001.

The moisture content of Example EVOH 1-5 and Comparative Example EVOH 1-5 was evaluated and analyzed by the method of ISO 14663-2 Annex A.

The torque and current of the extruder were calculated during the processing of Example EVOH 1-5 and Comparative Example EVOH 1-5. When extruding EVOH pellets with a single screw extruder (ME25/5800V4, OCS), the torque value and current value of the extruder were measured. The extrusion conditions were as follows: the temperature of the screw was Zone1 195° C., Zone2 215° C., Zone3 220° C., Zone4 230° C., Zone5 230° C.; and the screw speed was 7 rpm. If the torque was less than 30 Torque, "O" was marked for "excellent"; if the torque was 30-50 Torque, "Δ" was marked for "acceptable"; if the torque was greater than 50 Torque, "X" was marked for "poor". If the current was less than 30 Å, "O" was marked for "excellent"; if the current was 30-50 Å, "Δ" was marked for "acceptable"; if the current was greater than 50 Å, "X" was marked for "poor".

When evaluating the surface static electricity of Example EVOH 1-5 pellets and Comparative Example EVOH 1-5 pellets, 100 g of EVOH pellets were placed in a Nan Ya PE plastic bag (L28*W41 cm) and shaken for 1 minute, and then ANSI/ESD STM3.1 (DZ4, SHISHDO) was used to measure the surface electrostatic voltage of the pellets. If the static electricity was less than 5 kV, "O" was marked for "excellent"; if the static electricity was 5-10 kV, "Δ" was marked for "acceptable"; if the static electricity was greater than 10 kV, "X" was marked for "poor".

The film thickness uniformity of Example EVOH 1-5 and Comparative Example EVOH 1-5 was evaluated. The average thickness of a normal extruded film is 25 μm. Under the condition of uneven film thickness, a 10*10 cm film surface was selected and marked on 9 locations evenly. If there were more than 5 locations where the thickness was greater than the theoretical value ±10 μm, the film thickness was uneven. If the film thickness was normal, it was indicated by "O"; if the film thickness was uneven, it was indicated by "Δ"; if the film was broken, it was indicated by "X".

When evaluating the adhesion rate of fine powder of Example EVOH 1-5 and Comparative Example EVOH 1-5, 100 g of EVOH pellets and 10 g of fine powder (<100 μm) were placed in a Nan Ya PE plastic bag (L28*W41 cm) and shaken for 1 minute, then the pellets were taken out and the amount of fine powder remaining in the plastic bag was measured. Adhesion rate of fine powder was calculated by the following formula:

Adhesion rate of fine powder=(10-residual amount of fine powder in the plastic bag)/10*100%

If the adhesion rate of fine powder was less than 1%, "O" was marked for "excellent"; if the adhesion rate of fine powder was 1-3%, "Δ" was marked for "acceptable"; if the adhesion rate of fine powder was greater than 3%, "X" was marked for "poor".

The results show that Example EVOH 1-5 have lower torque output (10-31 Torque), current (10-45.5 Å) and static electricity (0.89-5.21 kV), showing that Example EVOH 1-5 exhibit better processing torque output and electrostatic characteristics. In addition, the adhesion rate of fine powder of Example EVOH 1-5 is quite low, only 0 to 1.5%, which shows that the adsorption of fine powder caused by static electricity on the surface of the EVOH resin composition is indeed reduced.

Based on the comparison in Table 1, the inventor found that three-stage drying with different dryers during processing of EVOH pellets can obtain the desired surface roughness of the present invention. The three-stage drying has the following characteristics:

The first stage of drying cannot use a strong turbulence dryer: Because the pellets have a higher moisture content and are soft during the first stage of drying, the use of a strong turbulence dryer will easily scratch the surface of the pellets and increase the surface roughness of the pellets.

The second and third stages of drying cannot both use a strong turbulence dryer: If the second and third stages of drying both use a strong turbulence dryer, the pellets will be rubbed for a long time, resulting in high surface roughness.

The test result of the present invention is that as long as the surface roughness of EVOH is controlled within a specific range, the torque and surface static electricity in the single screw extruder can be reduced. As shown in Table 1, Comparative Example EVOH 1, 2 and 3 have Vvc and Sxp beyond the expected range described in this article, and the test results show that they all have higher torque output (158-188 Torque), extruder current (231.7-275 Å) and static electricity (13.62-23.22 kV). Comparative Example 4 and 5 also have Vvc and Sxp that are beyond the expected range described in this article, which causes slipping due to insufficient friction between the particles, which makes the discharge unstable, so the film thickness uniformity after film formation is poor.

In addition, the number of bubbles of the films formed from Example EVOH 1-5 and Comparative Example EVOH 1-5 was calculated. The EVOH pellets were made into a 20 μm film using a single screw extruder, and five 10*10 cm blocks were selected, and the presence of bubbles in each block was observed with the naked eye. In the selected 5 blocks, if the number of bubbles was 0, "O" was marked for "excellent"; if the number of bubbles was greater than 1 but less than 3, "Δ" was marked for "acceptable"; if the number of bubbles was greater than 3, "X" was marked for "poor".

The films formed from Example EVOH 1-5 did not generate bubbles and showed excellent characteristics. Therefore, it was unexpectedly discovered that a further preferred embodiment of the present invention is that controlling the moisture content of the pellets within a certain range can effectively reduce the generation of bubbles during the formation of EVOH films.

Based on the comparison in Table 1, the inventor found that when EVOH pellets are processed using different dryers for three-stage drying, the prepared EVOH pellets can obtain the desired moisture content of the present invention (calculated in terms of volatile content). The three-stage drying has the following characteristics:

It is better not to use a static dryer for all three-stage drying: If a static dryer is used for all three-stage drying, the drying rate is slow, which may result in high moisture content of the pellets.

In summary, the EVOH resin composition of the present invention has low surface roughness, especially the core void volume (Vvc) of its surface is greater than 0.010 $\mu m^3/\mu m^2$ and less than 50 $\mu m^3/\mu m^2$; or its surface pole height (Sxp) is more than 0.010 μm and less than 9.0 μm. The surface roughness and moisture content of the EVOH resin composition can be controlled by using different dryers in three stages in the drying stage of the EVOH processing. The EVOH resin composition can be used to prepare films or multilayer structures. The inventor found that by controlling the surface roughness of the EVOH pellets, the torque output during EVOH processing can be reduced, the adsorption of fine powder on the surface of EVOH due to static electricity generated on the surface of EVOH can be reduced, and a good film thickness uniformity can be provided.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition in a form of pellet, comprising an ethylene-vinyl alcohol copolymer resin, wherein the ethylene-vinyl alcohol copolymer resin composition has a surface with a core void volume (Vvc) greater than 0.010 $\mu m^3/\mu m^2$ and less than 50 $\mu m^3/\mu m^2$, or a surface pole height (Sxp) more than 0.010 $\mu m$ and less than 9.0 $\mu m$, wherein the ethylene-vinyl alcohol copolymer resin has a saponification degree greater than 99.5 mole %.

2. The ethylene-vinyl alcohol copolymer resin composition of claim 1 having a moisture content of less than 1 wt %.

3. The ethylene-vinyl alcohol copolymer resin composition of claim 1, wherein the ethylene-vinyl alcohol copolymer resin has an ethylene content of 20-48 mole %.

4. The ethylene-vinyl alcohol copolymer resin composition of claim 2, wherein the ethylene-vinyl alcohol copolymer resin has an ethylene content of 20-48 mole %.

5. The ethylene-vinyl alcohol copolymer resin composition of claim 1 having a surface with a maximum line height (Rz) between 0.01 and 9.9 $\mu m$.

6. The ethylene-vinyl alcohol copolymer resin composition of claim 2 having a surface with a maximum line height (Rz) between 0.01 and 9.9 $\mu m$.

7. The ethylene-vinyl alcohol copolymer resin composition of claim 1 having a surface electrostatic voltage of less than 6 kV.

8. The ethylene-vinyl alcohol copolymer resin composition of claim 2 having a surface electrostatic voltage of less than 6 kV.

9. The ethylene-vinyl alcohol copolymer resin composition of claim 1 comprising two or more ethylene-vinyl alcohol copolymers with different ethylene contents.

10. The ethylene-vinyl alcohol copolymer resin composition of claim 2 comprising two or more ethylene-vinyl alcohol copolymers with different ethylene contents.

* * * * *